UNITED STATES PATENT OFFICE.

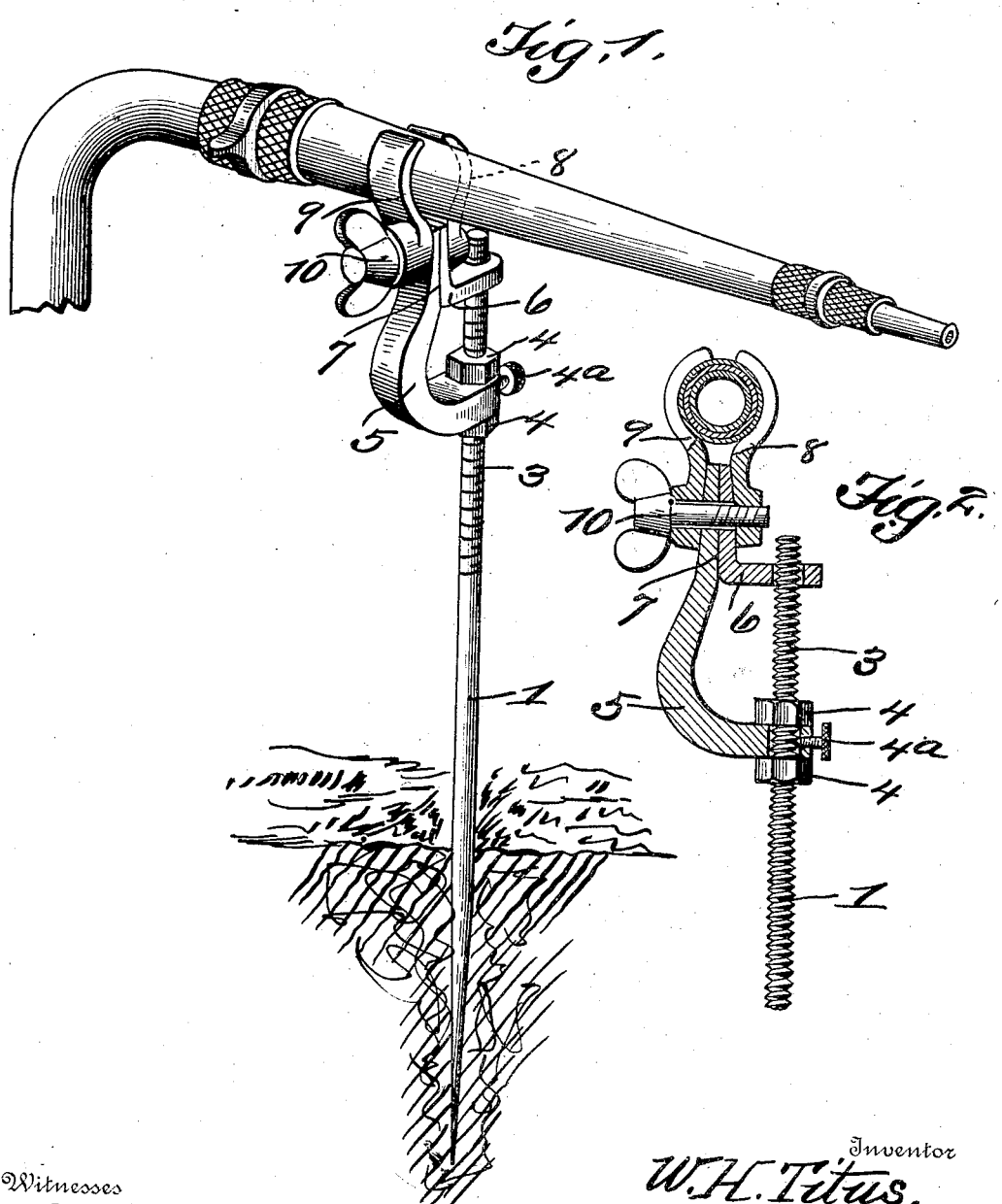

WILLIAM H. TITUS, OF NEODESHA, KANSAS.

NOZZLE-HOLDER.

954,902.

Specification of Letters Patent. Patented Apr. 12, 1910.

Application filed November 4, 1909. Serial No. 526,300.

*To all whom it may concern:*

Be it known that I, WILLIAM H. TITUS, a citizen of the United States, residing at Neodesha, in the county of Wilson and State of Kansas, have invented a new and useful Nozzle-Holder; and I do hereby declare the following to be a full, clear, and exact description of the invention, such as will enable others skilled in the art to which it appertains to make and use the same.

The invention relates to a nozzle holder adapted for use in watering gardens, lawns and the like.

Where it is desired to support the nozzle of a hose in one position for any considerable length of time, this invention will prove itself very valuable and useful.

One of the objects of the invention is to provide a device of this character having clamps adapted to receive the nozzle or hose of various sizes.

Another object of the invention is to provide an improved device of this character in which the clamping means can readily be turned on a pivot.

In the drawings:—Figure 1 is a perspective view of a nozzle holder constructed in accordance with this invention. Fig. 2 is a vertical sectional view.

Referring to the drawings:—1 designates a post which is provided with a pointed end adapted to be inserted in the ground and which is provided with screw threads 3 engaged by a screw threaded nut 4. Immediately above nut 4 is an L-shaped brace or bracket 5 which coöperates with a smaller L-shaped bracket 6. The upper extremities of the brackets 5 and 6 converge as shown at 7. On the outer face of the bracket 6 is a section 8 of a clamp, which coöperates with a similar section 9 which is arranged on the outer face of the bracket 5. The clamping member 8 is provided with screw threads which are engaged by a thumb screw 10 which connects the four parts 6, 7, 8 and 9 into one rigid body. The brackets 5 and 6 are pivotally mounted on the post 1, as shown, and this can readily be turned from one direction to the other so that the post will not have to be moved when it is desired to change the position of the nozzle.

What is claimed is:—

In combination, a post having a threaded end, an L-shaped member slidable on the post, a smaller L-shaped member slidable on the post adapted to abut against the upper end of the first member, clamping members to engage the upper ends of the L-shaped members, one of said clamping members being provided with screw threads, and a screw extended through the L-shaped members and the clamping members and threaded to said screw threaded member.

In testimony whereof I have signed my name to this specification in the presence of two subscribing witnesses.

WILLIAM H. TITUS.

Witnesses:
JOHN M. COFFETT,
PAULINE SEAMAN.